United States Patent [19]
Bosten et al.

[11] Patent Number: 5,375,636
[45] Date of Patent: Dec. 27, 1994

[54] POCKET JOINT CUTTER SYSTEM

[75] Inventors: Donald R. Bosten; Earl R. Clowers, both of Jackson; Daniel P. Wall, Humboldt; George W. Mitchell, Jackson, all of Tenn.

[73] Assignee: Porter-Cable Corporation, Jackson, Tenn.

[21] Appl. No.: 29,857

[22] Filed: Mar. 11, 1993

[51] Int. Cl.$^5$ .......................... B27M 1/08; B27C 3/00
[52] U.S. Cl. ...................... 144/3 R; 33/567; 33/571; 33/573; 83/454; 83/456; 83/459; 83/467.1; 83/468; 29/26 A; 144/35 R; 144/92; 144/136 R; 144/365; 144/367; 144/368; 269/157; 269/236; 269/239
[58] Field of Search ................. 33/562, 567, 571, 573; 29/26 D, 26 B, 33 R; 83/453, 454, 456, 459, 464, 465, 466, 467.1, 468, 468.1, 468.2, 522.11, 522.6; 269/87.3, 157, 203, 205, 236, 239, 303, 304, 307; 144/1 R, 3 R, 35 R, 92, 134 R, 136 R, 367, 368, 371

[56] References Cited
U.S. PATENT DOCUMENTS 4,603,719  8/1986  Durney ................. 408/26
4,944,627  7/1990  Durney .
5,063,982  11/1991  Durney ................. 144/368

Primary Examiner—W. Donald Bray
Attorney, Agent, or Firm—Merchant, Gould, Smith, Edell, Welter & Schmidt

[57] ABSTRACT

A pocket joint cutter system for forming a pocket cut and fastener bore into a workpiece. The pocket cut and fastener bore receives a fastener such as a self-tapping screw which passes through the bore and into a second workpiece for forming a joint between the two workpieces. The head of the fastener is held within the pocket cut in order to secure the joint. In one preferred form of the present invention, a workpiece system secures the workpiece in a predetermined position and forms the pocket cut and fastener bore into the workpiece. This preferred embodiment further comprises a bench-mounting system coupled to the workpiece system for securing the system to a bench. Using this embodiment of the present invention, the system can be mounted to a bench, and the workpiece can be brought to the system and held in position while the user forms the pocket cut and fastener bore. In an alternate form of the present invention, the system comprises a pocket cutter system for forming the pocket into a surface of the workpiece and a drill guide system for guiding a drill bit in order to form the fastener bore into the pocket at an orientation which is perpendicular to a joint surface of the workpiece. With such a perpendicular orientation of the fastener bore, the two workpieces are less inclined to creep up or down with respect to one another, in contrast to systems which position the fastener bore at a non-perpendicular angle to the joining interface between the two workpieces.

61 Claims, 8 Drawing Sheets

POCKET JOINT CUTTER SYSTEM

BACKGROUND AND SUMMARY OF THE INVENTION

The present invention is a pocket joint cutter system for forming a pocket cut and fastener bore into a workpiece. The pocket cut and fastener bore receives a fastener such as a self-tapping screw which passes through the bore and into a second workpiece for forming a joint between the two workpieces. The head of the fastener is held within the pocket cut in order to secure the joint.

In one preferred form of the present invention, a workpiece system secures the workpiece in a predetermined position and pivotally guides a cutter for forming the pocket cut and fastener bore into the workpiece. This preferred embodiment further comprises a bench-mounting system coupled to the workpiece system for securing the system to a bench. Using this embodiment of the present invention, the system can be mounted to a bench, and the workpiece can be wrought to the system and held in position while the user forms the pocket cut and fastener bore.

In an alternate form of the present invention, the system comprises a pocket cutter system for forming the pocket into a surface of the workpiece and a drill guide system for guiding a drill bit in order to form the fastener bore into the pocket at an orientation which is perpendicular to a workpiece surface which is to be joined to a second workpiece surface. With such a perpendicular orientation of the fastener bore, the two workpieces are less inclined to creep up and down with respect to one another, in contrast to systems which position the fastener bore at a non-perpendicular angle to the joining interface between the two workpieces.

DESCRIPTION OF THE PREFERRED EMBODIMENT

Figure 1:
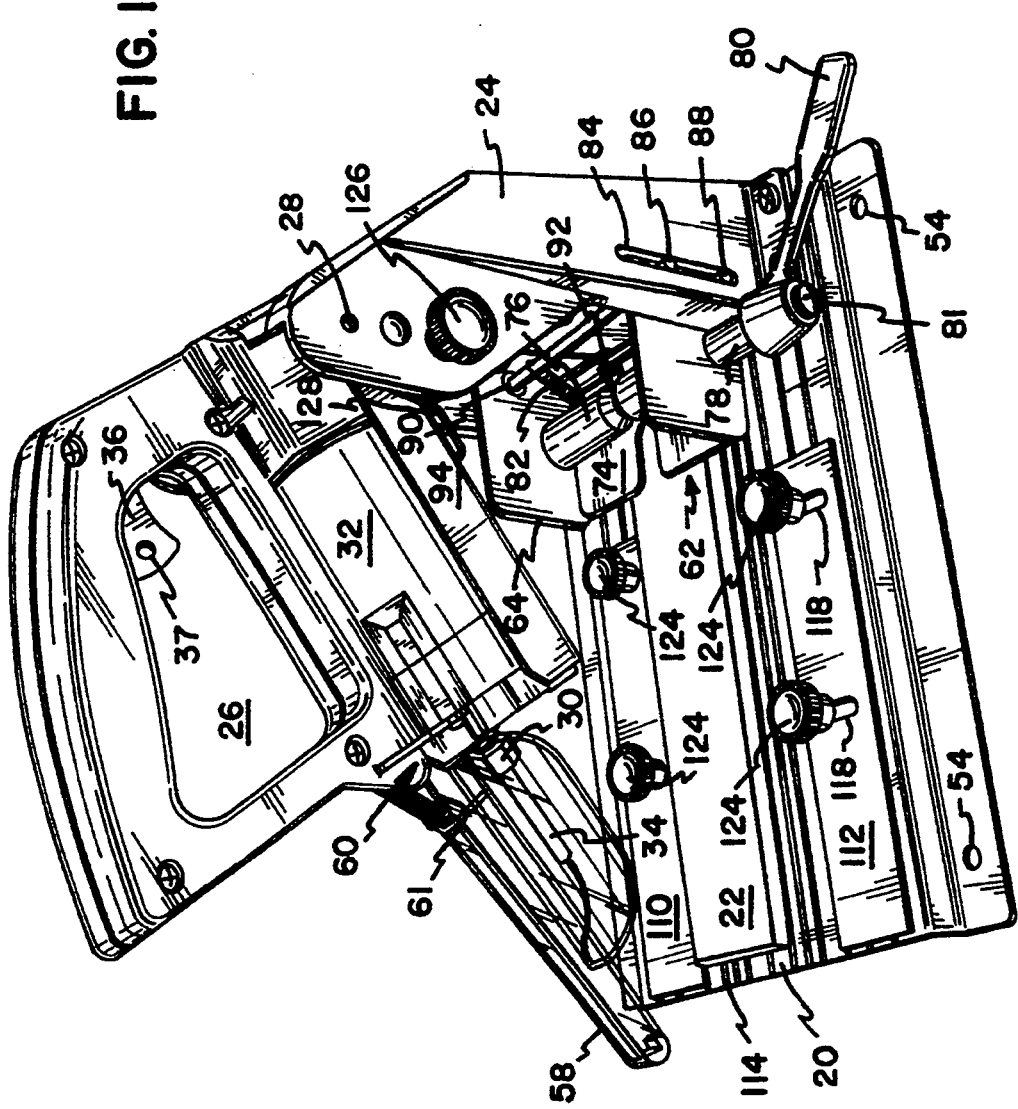
FIG. 1 is a top and right front perspective view of the preferred embodiment of the present pocket joint cutter system supporting a workpiece.

The preferred pocket cutter described in the present system is available from Porter-Cable Corporation, the assignee of the present application, as model number 550. The preferred embodiment comprises a base 20 for supporting a workpiece 22, a substantially vertical column 24 supported by the base, and a router 26 pivotably supported above base 20 about a pivot axis 28. Pivot axis 28 is preferably formed by shafts coupled between a motor mount 94 supporting router 26 and an upper portion of column 24. Router 26 typically comprises a collet 30 rotated by a router motor 32. The collet comprises means for securing a router bit 34 to be spun at high rpm by the motor when the motor is activated by a switch 36. Switch 36 may include an aperture 37 located so that, when a padlock is fitted to the aperture, the switch cannot be actuated. Motor 32 is typically powered electrically by a line cord (not shown), although other types of motors (e.g. a motor powered by a rechargeable battery or by air) conceivably could be used. Preferred base 20 is approximately 12 inches long; all other dimensions of the preferred embodiment are drawn approximately to scale in the figures. The preferred system is designed to cut 5/16ths inch wide slots, 5/16 inch to ¾ inch deep, in material that is ⅝ths inch to 1½ inches thick and at east 11/16ths inch wide.

Figure 2:
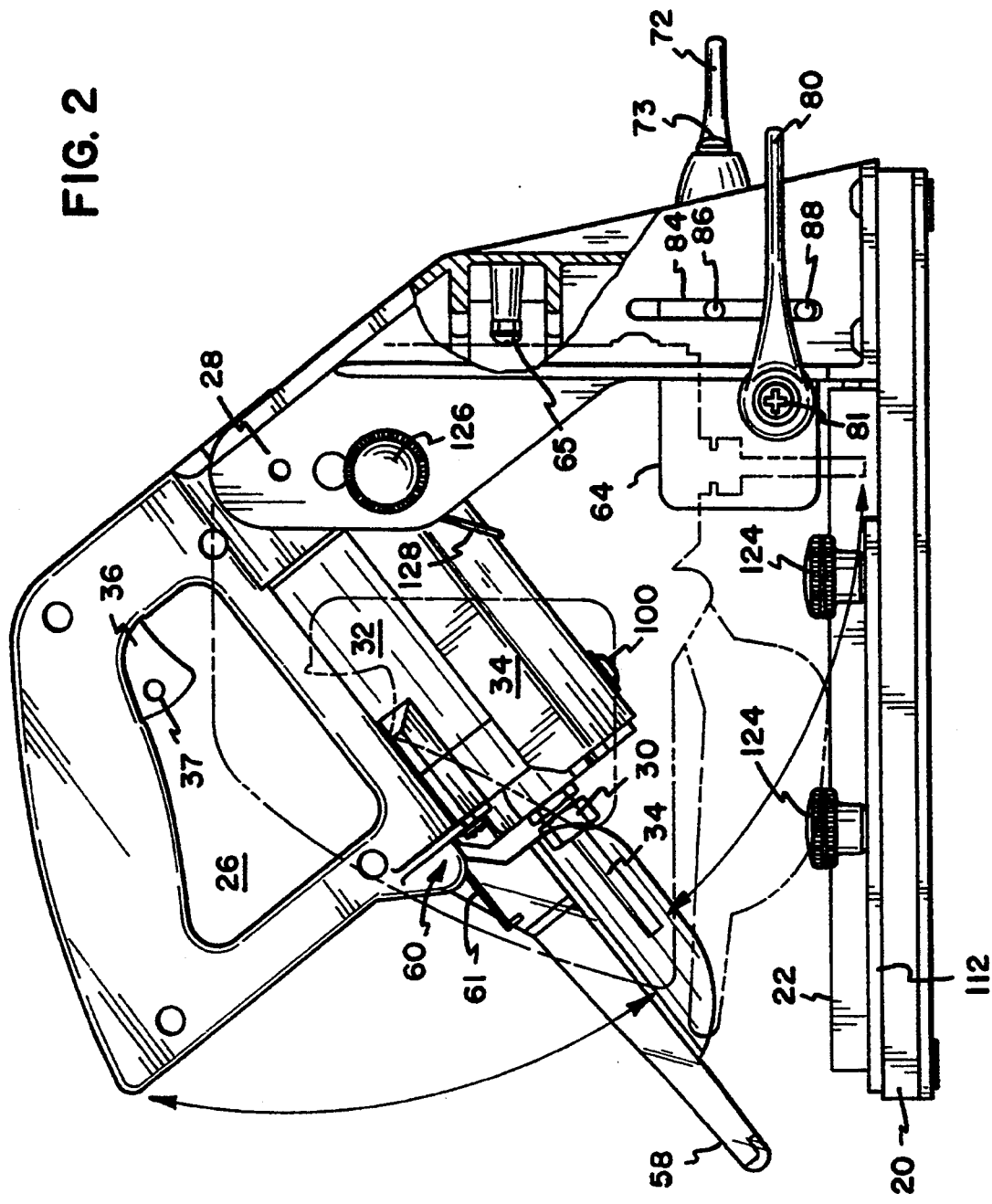
FIG. 2 is a right side elevational view of the preferred embodiment showing movement of the system for cutting a pocket cut into the workpiece.

Referring to FIG. 2, router 26 is pivotable from an upward position in which router bit 34 is above workpiece 22 to lower positions which swing router bit 34 in an arc to make a pocket cut 38 (see FIG. 4) into an upper surface of workpiece 22. Router bit 34 may be of the single-flute, carbide-tipped variety sized for cutting a slot having a width of 5/16 inch. A preferred router bit is available from Porter-Cable Corporation under part number 43115.

As is illustrated in FIG. 2, the travel of router 26 as it pivots to make a pocket cut is limited in the preferred embodiment by a router stop screw 65, which is adjustably supported by column 24. Stop screw 65 is preferably set so that the distance between the end of work piece 22 and the end of the pocket-cut slot is ¾ inch. This distance can be varied by adjusting the protrusion of stop screw 65 from column 24. For example, it may be desirable to have a distance greater than ¾ inch between the end of the pocket-cut slot and the end of a workpiece when attaching the workpiece to a relatively thin second work piece, so that the fasteners used in the pocket joint do not protrude through the second workpiece.

Referring again to FIG. 4, a drill guide 40 is shown supported by column 24 for guiding a drill bit 42 in order to drill fastener bore 46 into pocket cut 38. Drill bit 42 is typically driven by a chuck 44 of a portable drill, for example, a drill powered with an electrical line cord, with rechargeable batteries, or by air. Drill bit 42 may have a diameter of 7/64ths of an inch and preferably has a length of 6 inches. Such a drill bit is available from Porter-Cable Corporation under part number 5504. Drill guide 40, which includes a bore 48 just larger than the diameter of drill bit 42, is supported in the preferred embodiment by column 24 in such a manner that fastener bore 46 is drilled at a perpendicular angle to joint surface 50 of workpiece 22.

Figure 5:
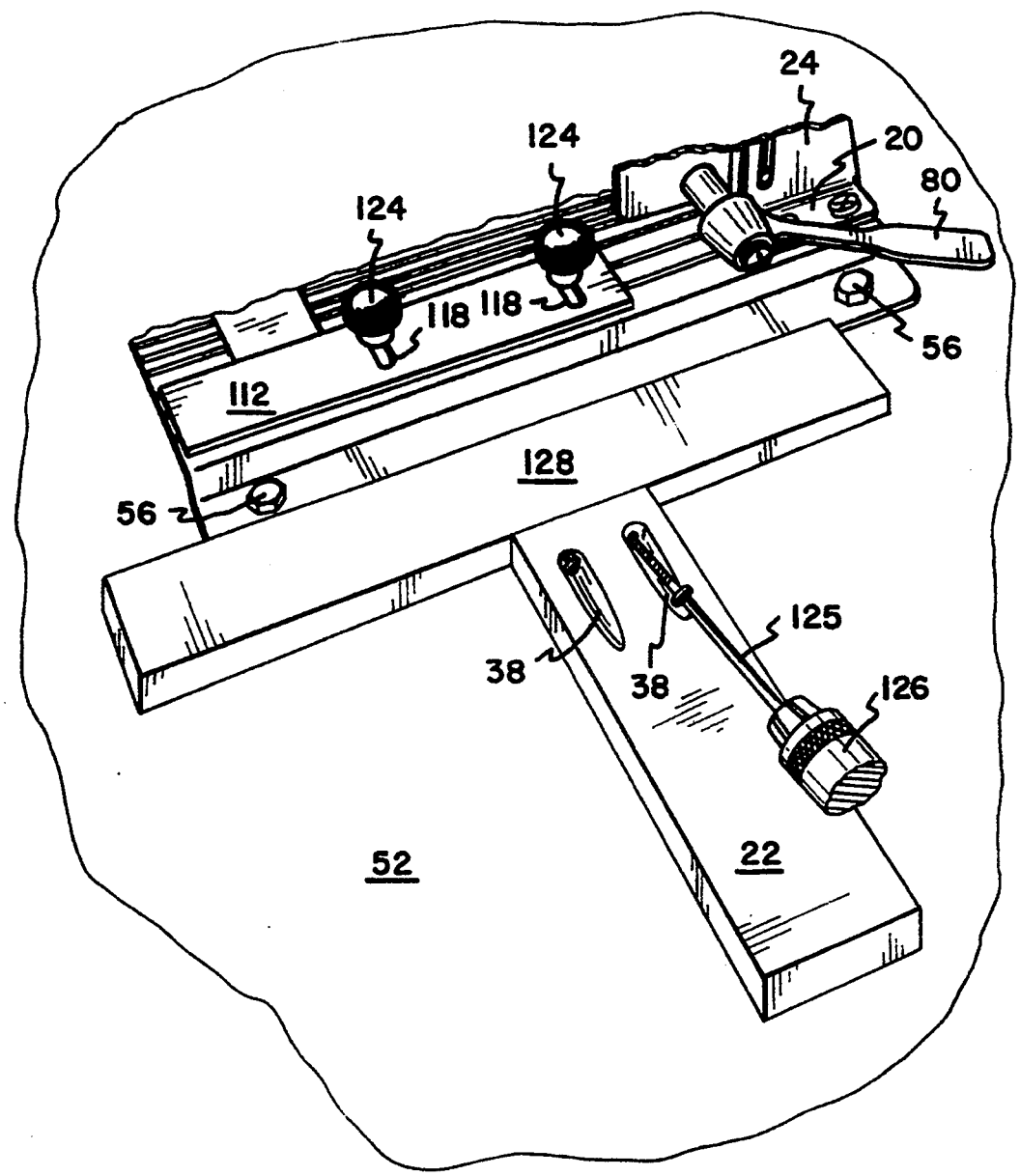
FIG. 5 illustrates the formation of a joint between two workpieces using one edge of the preferred system while mounted to a bench in order to temporarily secure the two workpieces together during the final stages of assembling the joint.

It is preferred that base member 20 comprises a bench-mounting system for securing the base member to a bench 52 (see FIG. 5). In the preferred embodiment, the bench-mounting system comprises apertures 54 (See FIG. 1) which are defined by base member 20 and which may be used for securing base member 20 to a bench 52 using conventional bolts, lag screws or other fasteners 56. In some applications, it may be more convenient to attach base member 20 to a piece of plywood or other stock and then clamp the plywood to the bench.

The preferred system includes a router bit protective shield 58, typically formed of clear polycarbonate plastic. Router bit protective shield 58 has a configuration which surrounds the length of router bit 34 and pivots at a location 60 proximate to collet 34. Shield 58 is preferably biased toward router bit 34 by a biasing spring 61. As can be seen by reference to FIG. 2, shield 58 rotates about a pivot point 60 in order to safely cover router bit 34 as router 26 is lowered to make a pocket cut.

Figure 3:
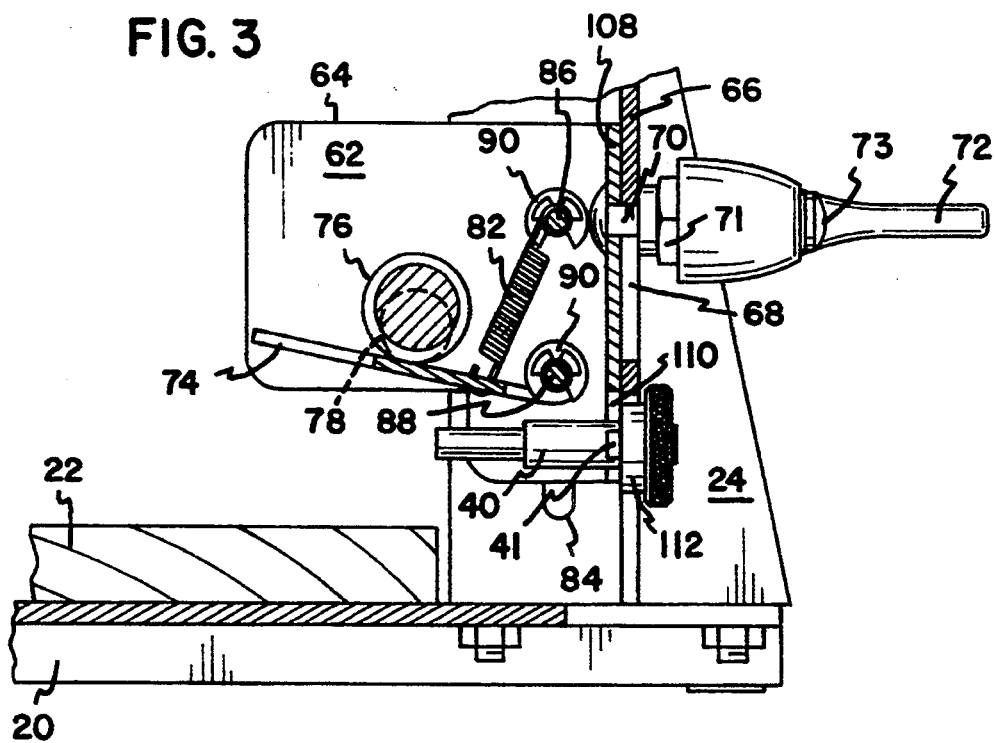
FIGS. 3 and 4 illustrate features of the preferred system for clamping the workpiece to the base of the present pocket cutter system.
Figure 4:
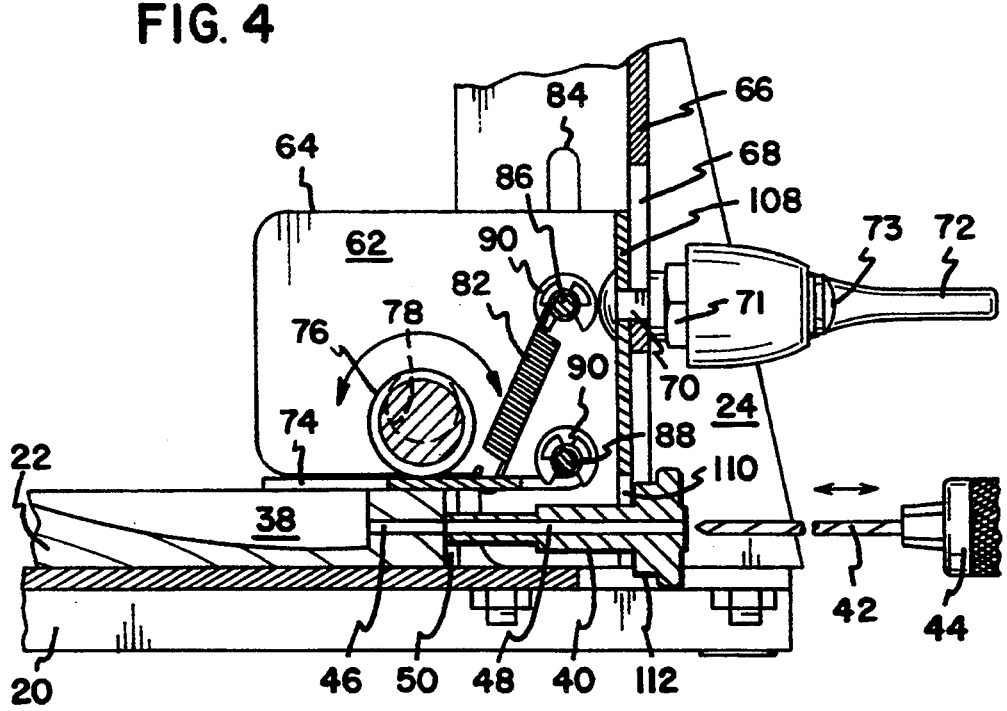

As is shown in FIGS. 3 and 4, the preferred system includes a quick-action clamping system 62 for quickly securing workpiece 22 to base member 20. This system includes a variable-workpiece-thickness adjustment system for adjusting the capacity of the quick-action clamp to selected nominal workpiece thicknesses. FIG. 3 illustrates preferred clamping system 62 adjusted to its uppermost position, and FIG. 4 illustrates the clamping system positioned for a particular workpiece, which is shown clamped to base member 20.

Figure 7:
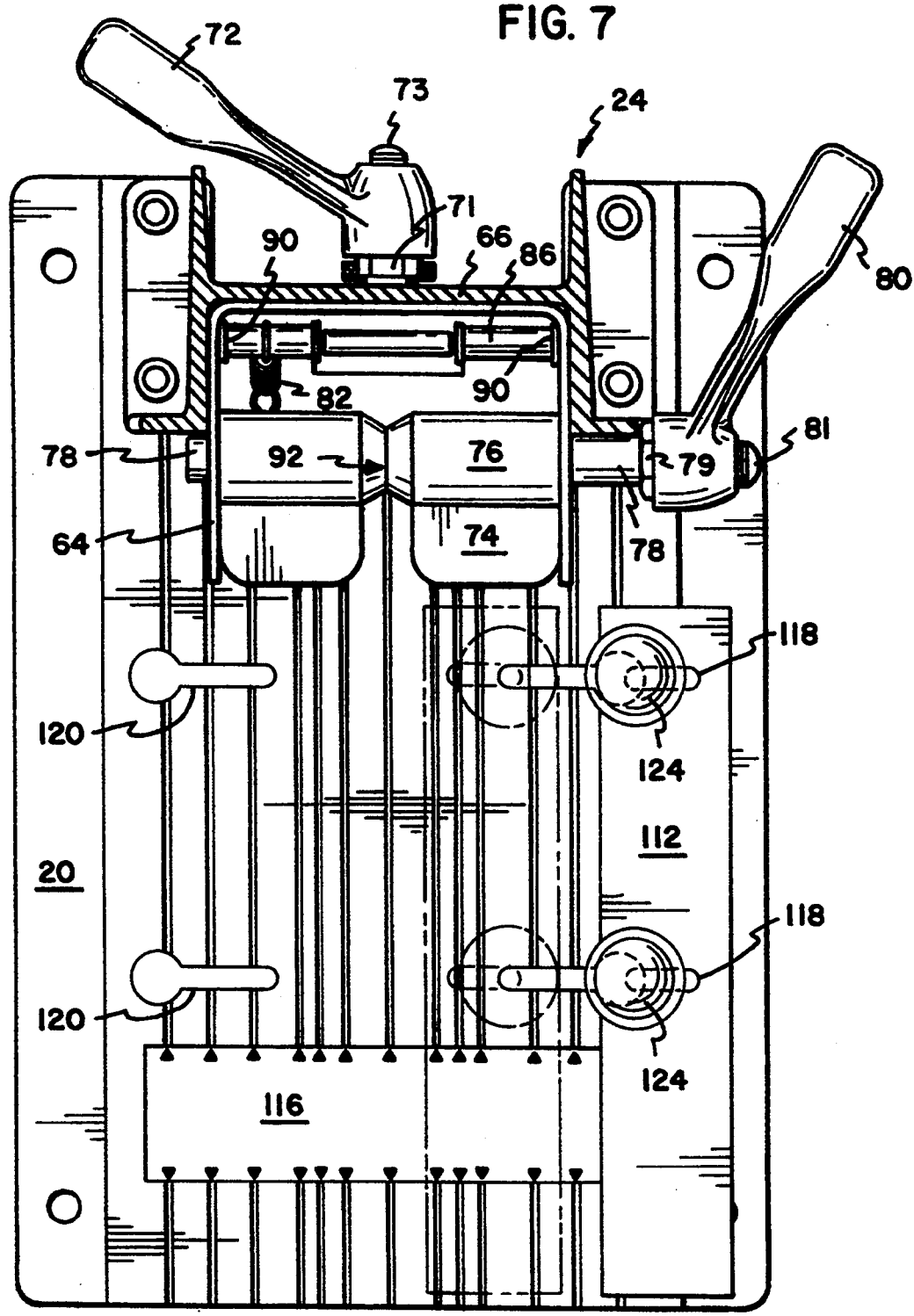
FIG. 7 is a partial-cross-section top plan view of the preferred system illustrating features of a clamping and base system.

Preferred clamping system 62 comprises a clamp bracket 64 which can be seen in FIG. 7 to comprise a "U"-shaped configuration with the three outer surfaces of the "U" shape being supported within one-half of a preferred I-beam configuration of column 24. Central web 66 of the I-beam forming preferred column 24 defines a vertical slot 68, and clamp bracket 64 is adjustably secured to column 24 by a bolt 70 which passes through an aperture defined by clamp bracket 64, through slot 68 in column 24 and into a threaded clamp adjustment lever or handle 72. Clamp adjustment lever 72 can be used in order to tighten clamp bracket 64 to a position suitable for the nominal thickness of workpiece 22.

In the preferred embodiment, "U"-shaped clamp member 64 is further guided in the front half of the I-beam configuration of column 24 by two guide pins 86 and 88 which pass through upper and lower portions of the back of clamp bracket 64 and which protrude from either side of the clamp bracket. Guide pins 86 and 88 ride in two vertical slots 84, one on each side of column 24, and are typically held in place within clamp bracket 64 by E-clips 90, which clip into appropriately-positioned grooves adjacent the side surfaces of clamp bracket 64.

Clamping system 62 further comprises a clamp plate 74 having a lower surface which contacts the upper surface of workpiece 22 in order to clamp the workpiece into position. Clamp plate 74 forms essentially a bottom wall of "U"-shaped clamp bracket 64 and pivots about a guide pin or shaft 88, which preferably passes through both sides of clamp bracket 64 in a lower region of the clamp bracket toward the base of its "U"-shaped configuration.

In the preferred embodiment, clamp plate 74 is clamped against workpiece 22 by an eccentric shaft 76 which comprises an axis member 78 (see FIG. 7). Axis member 78 preferably passes through both sides of clamp bracket 64 just above clamp plate 74 and typically is attached on one end to a work clamp lever or handle 80.

Both clamp adjustment lever 72 and work clamp lever 80 are preferably mounted on hex-shaped hubs 71 and 79, respectively, thus permitting lever orientation to be adjusted to suit individual preferences. In the preferred embodiment, levers 72 and 80 may be adjusted by loosening lever retaining screws 73 and 81, respectively, pulling the levers outward, rotating the levers to their desired positions, pushing the levers back onto their respective hex hubs, and tightening the retaining screws.

Clamping system 62 is typically adjusted using a scrap piece of material having the same thickness as workpiece 22. The scrap material is placed on base member 20 below clamp plate 74. Clamp handle 72 is rotated counterclockwise to an open position in order to loosen clamp bracket 64 with respect to column 24. With the workpiece or scrap material 22 positioned against drill guide 40, clamp assembly 62 is lowered until it contacts the upper surface of material 22, and clamp adjustment lever 72 is then tightened by rotating it clockwise. Work clamp lever 80 (see FIG. 2) is then rotated in order to rotate eccentric shaft 76 from the position shown in FIG. 3 to the position shown in FIG. 4 in order to bias clamp plate 74 onto the scrap material. Material 22 should then be firmly clamped to base member 20.

If clamping system 62 has been adjusted too far downward (such that the clamp is too tight and will not fully close to the clamped position), the previous steps can be repeated, raising clamping system 62 slightly using clamp adjustment lever 72. Conversely, if the clamping is too loose (i.e. if the material is not firmly clamped), the previous steps can be repeated in order to lower clamping system 62 slightly.

Preferred clamping system 62 comprises a "V" notch 92 (see FIGS. 1 or 7) which is located and adapted for alignment with a mark on the workpiece at a desired side-to-side position of the pocket cut. "V" notch is typically used when it is desired by the user to position a pocket cut to a mark on the workpiece at the desired location of the cut. Such an approach to positioning a workpiece is not typically necessary in the preferred embodiment, since other positioning alternatives built into the preferred system and further described below are also frequently used. Positioning the workpiece to a mark is used primarily in the preferred embodiment on a material more than 10 inches wide. When "V" notch 92 is used for positioning the workpiece, a pencil mark is placed on the workpiece at each location a pocket cut is desired, and the pencil mark is aligned with the center of "V" notch 92, which in the preferred embodiment is formed on eccentric shaft 76 (see FIGS. 1 or 7).

Motor 32 of router 26 is preferably mounted in a pivoting cradle or motor mount 94 which pivots about pivot axis 28 (see FIG. 1). Pivot axis 28 is preferably formed by shafts coupled between one end of motor mount 94 and an upper portion of column 24.

Figure 6:
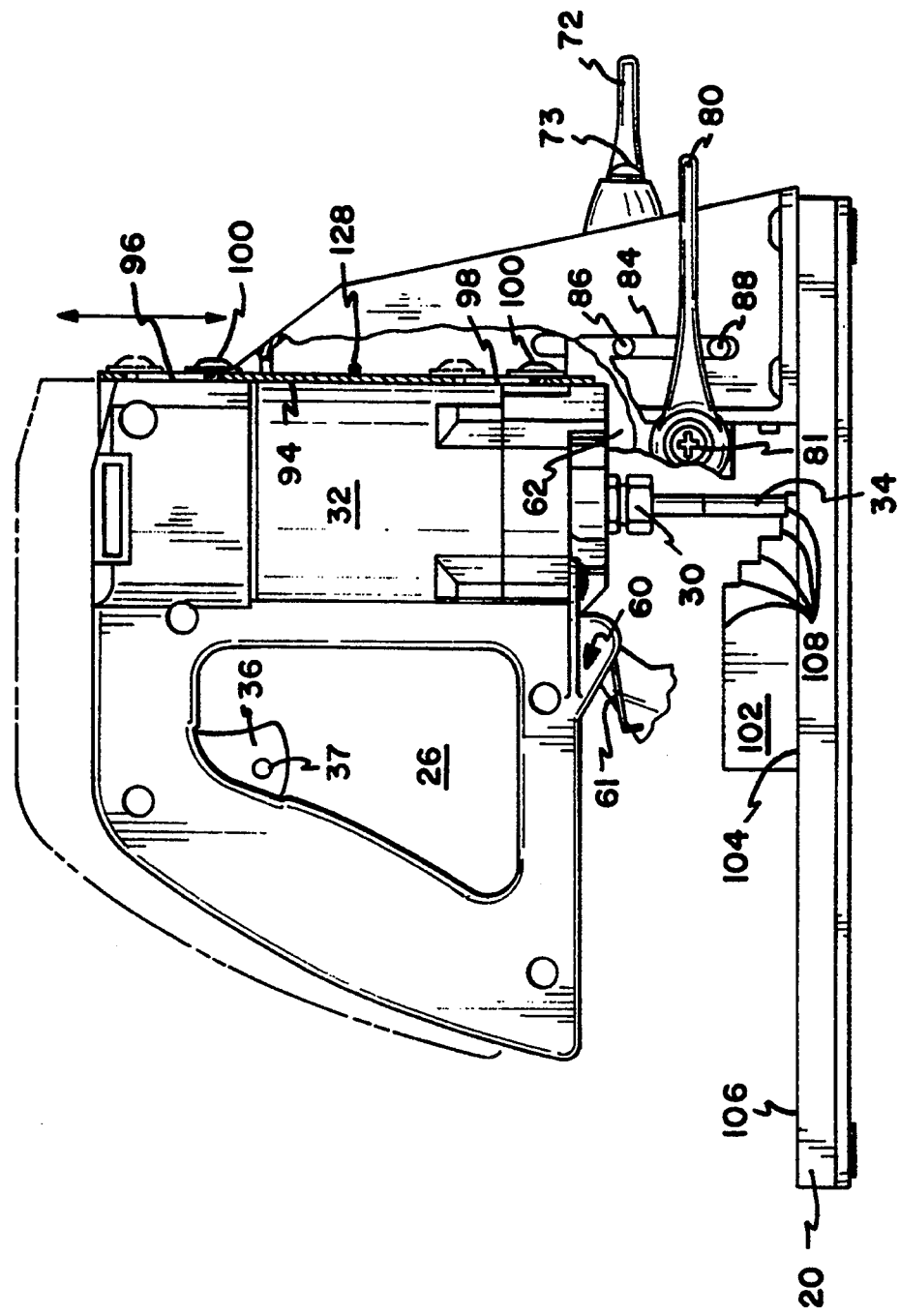
FIG. 6 is a right side elevational view of the preferred embodiment and illustrates a preferred system for adjusting the depth of cut.

Referring now to FIG. 6, a preferred depth-of-cut djustment system is shown. Within this system, preferred motor mount 94 defines upper and lower slots 96 and 98 respectively, and a cap screw 100 passes through each of the two slots into the housing of motor 32, thus securing motor 32 to housing 94. By loosening cap screws 100, router 26 may be moved up and down as is shown in FIG. 6 in order to adjust the depth of cut of router-bit 34.

The preferred router-bit depth-of-cut setting system comprises a stepped guide block 102 having a lower surface 104 for placement on an upper surface 106 of base member 20. Guide block 102 defines a plurality of router bit guide surfaces 108 located at a plurality of predetermined distances above the lower surface of the guide block. Preferred guide block 102 comprises a label corresponding to each router bit guide surface 108, and each label designates a nominal workpiece thickness corresponding to the depth of cut established by the particular guide surface. By adjusting the router bit depth-of-cut adjustment as shown in FIG. 6 until the lower end of router bit 34 contacts a particular guide surface 108, an appropriate depth of cut is established for the nominal workpiece thickness indicated by the corresponding label. In the preferred embodiment, the five guide surfaces 108 shown in FIG. 6 are labeled, respectively, from surface 104 upward, with 0.625, 0.750, 1,000, 1,250 and 1,500 to indicate the nominal thickness in inches of the workpiece to be used in combination with the router bit setting established with the respective guide surface.

In the preferred embodiment, drill guide system 40 is secured to a back member 108 of clamp bracket 64 and, accordingly, moves up and down with clamping system 62 as it is adjusted to the desired thickness of workpiece 22. Drill guide 40 is preferably mounted in a vertical slot 110 defined in back member 108 and, accordingly, can preferably be adjusted up and down on back plate 108, in order to vary the distance of fastener bore 46 from the upper surface of workpiece 22. The portion of drill guide 40 which passes through slot 110 comprises a groove 41 (see FIG. 3) located on the right and left sides of the drill guide. Accordingly, if it is desired to adjust the distance of fastener bore 46 with respect to the upper surface of workpiece 22, drill guide 40 may be repositioned up and down within slot 110. Guide 40 is held into position not only with grooves 41 on each side of the guide but is also held into position via drill guide retaining nut 112, which is threaded onto the main body of drill guide 40 and which maintains the position of drill guide 40 in slot 110 by being tightened up against the back surface of clamp bracket member 108.

Drill guide 40 preferably is positioned in slot 110 in order to align the fastener bore ⅜ inch below the upper surface of workpiece 22. This setting may be used for all pocket cuts by leaving drill guide 40 in this position on clamp bracket 40. Using this approach, drill guide 40 will move up and down with clamping system 62 and maintain the preferred distance of fastener bore 46 below the upper surface of workpiece 22.

The preferred pocket cutter system comprises a variety of systems for guiding the position of workpiece 22 for location of the pocket cut and fastener bore. In this regard, "V" notch 92 was previously described as being particularly applicable in the preferred embodiment to workpieces more than 10 inches wide. For workpieces less than 10 inches wide, the preferred system is configured with fences 110 and 112, which are typically used for material that is three inches or less in width, as well as lines or index ribs 114 which, as with fences 110 and 112, are oriented longitudinally along the length of the base, parallel with the longitudinal edge of a workpiece.

As is illustrated in FIG. 5, it is generally recommended that a minimum of two pocket cuts 38 be used at each joint. These pocket cuts can be positioned on the workpiece using "V" notch 92 as previously described, using fences 110 and 112, or using index ribs or lines 114. In the preferred embodiment, lines 114 are grooved into the upper surface of base 20, thus forming ribs which may be used as alignment guides to help position fences 110 and 112 or workpieces 22. Furthermore, a scale 116 (see FIG. 8) is provided in the preferred embodiment for use in locating various sizes of material.

As previously indicated, fences 110 and 112 are typically used in the preferred embodiment for material that is three inches or less in width. Accordingly, the fences are well suited for style and rail type construction. When adjusted as described below, fences 110 and 112 facilitate easy production of two pocket cuts per joint, with approximately 50% of the material between fastener bore holes, and approximately 25% of the material between each fastener hole and the adjacent edge of workpiece 22.

Figure 9:
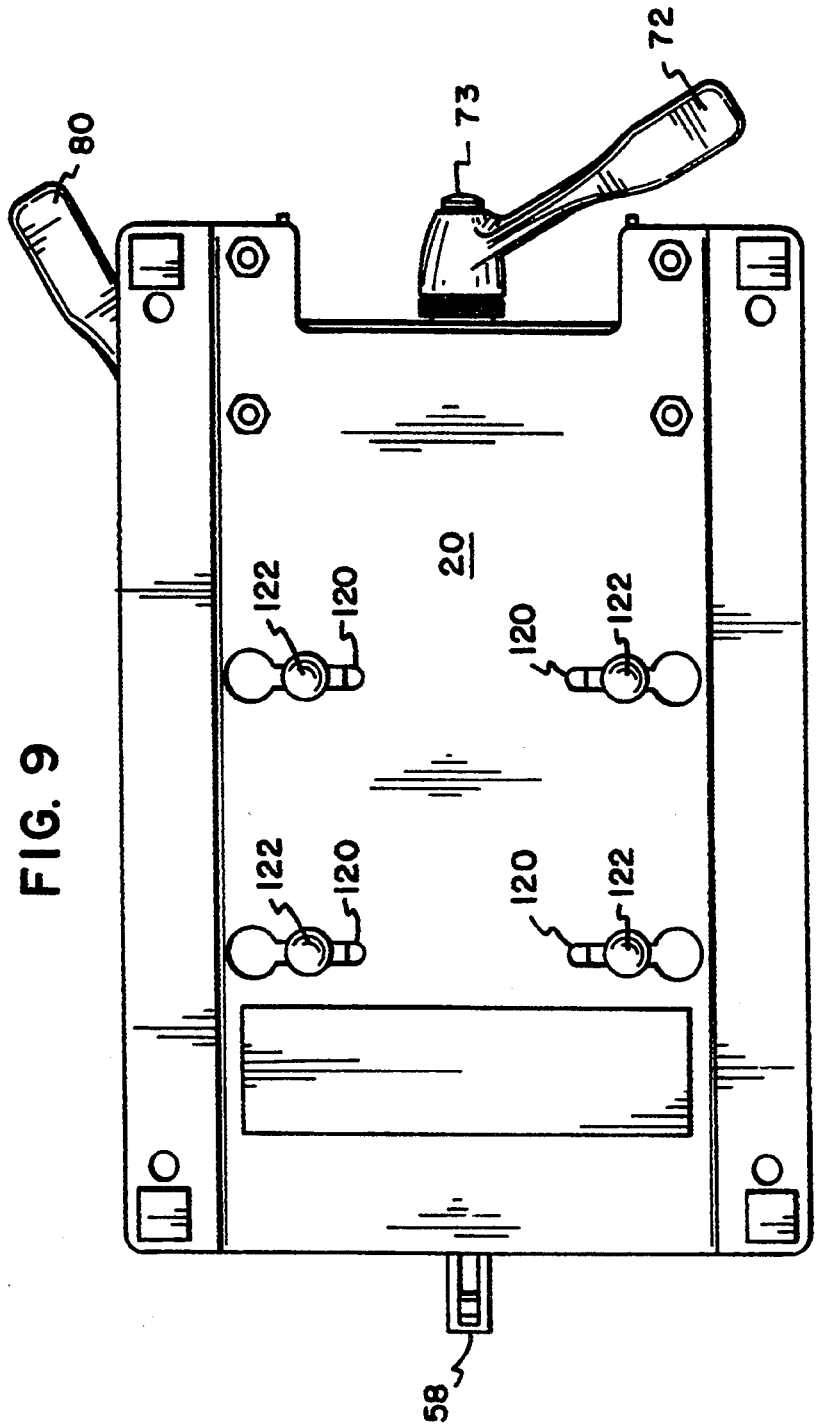
FIG. 9 is a bottom plan view of the preferred system.

In the embodiment shown, each fence 110 and 112 includes two crosswise slots 118, and base 20 likewise includes crosswise slots 120, which are illustrated in FIG. 9. Bolts 122 pass up through slots 120 from below base 20, up through slots 118 in fences 110 and 112, and into fence clamp knobs 124, which can be tightened to secure the fences into position. Base slots 120 are more narrow than the diameter of the head of each bolt 122, except at one end of each base slot 120, where the slot is enlarged so that the fences can be easily removed by loosening fence clamp knobs 124 and sliding the fence-/bolt/knob assemblies into alignment with the enlarged portion of each base slot 120 for easy removal. Fences 110 and 112 are typically removed when working with wide materials. When the fences are removed, fence clamp knobs 124 are typically tightened lightly in order to store the fence/bolt/knob assemblies for future use.

In order to position fences 110 and 112 for use on base 20, the assemblies are positioned onto the base, the four fence clamp knobs are loosened, the bolts are positioned on base slots 120, and the fences are slid outward to provide space for positioning the workpiece onto the base. It is typical to place a piece of scrap material having the same width as the planned work onto base 20 and to align the left side of the material with a left rib index (see upper row of index numbers illustrated in FIG. 8) corresponding to the material width. During this process, the material typically also is positioned against drill guide bushing 40. Work clamp lever 80 then normally is rotated counterclockwise in order to clamp the material to the base. Right fence 112 is then positioned against workpiece 22 and tightened in place with its two fence clamp knobs 118. Work clamp lever 80 is then loosened, and the scrap material is aligned to its right edge with the corresponding right index rib. Workpiece clamp lever 80 is then again tightened, and the left fence is moved against the left edge of the scrap material, and the left fence clamp knobs are tightened.

Figure 8:
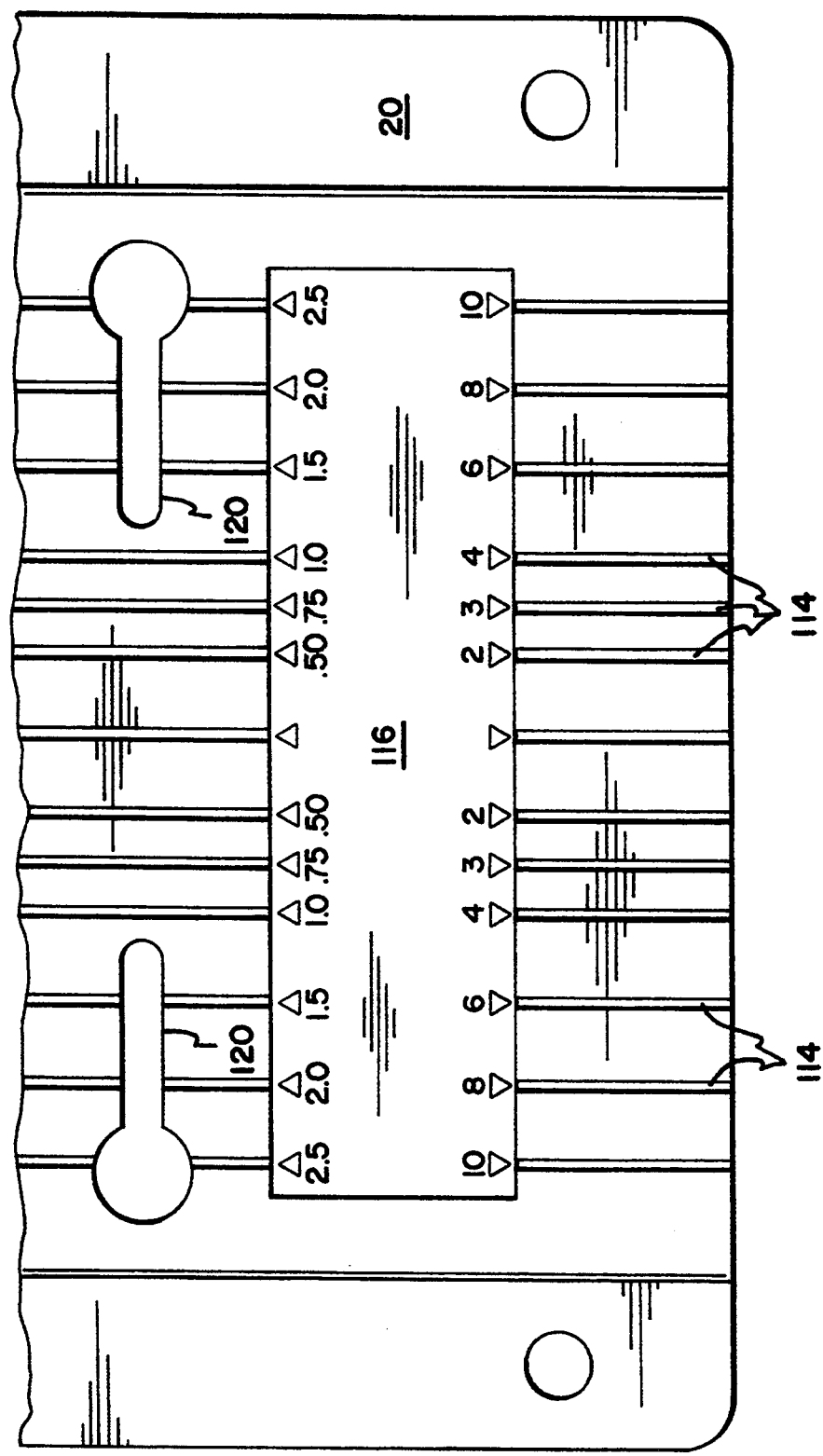
FIG. 8 is a top plan view illustrating a preferred indexing and alignment system.

If the fences are removed, in order to position a workpiece for a right cut, the workpiece is placed onto base 10 so that its right edge aligns with a right index rib, corresponding to the material width indicated on the lower portion of scale 116 shown in FIG. 8. Work clamp lever 80 is then normally rotated counterclockwise to secure the workpiece, and the right pocket cut is made. After loosening workpiece clamp lever 80, the workpiece then is positioned for its left cut by placing the workpiece onto the base so that its left edge aligns a left index rib corresponding with the material width indicated on the lower portion of scale 116. Work clamp lever 80 is then again rotated counterclockwise to secure the workpiece to base 20, and the left pocket cut is made.

As is illustrated in FIG. 5, after workpiece 22 has been configured with appropriate pocket cuts and fastener bores, it is typical to use Phillips or square drive screws in order to fasten workpiece 22 to a second workpiece 128. These screws, for example, may be 1¼ inch or 1½ inch square drive screws, such as are available from Porter-Cable Corporation in sets of 100 under part numbers 5501 or 5502, respectively. Such screws can be driven using a powered driver 125 driven, for example, by the chuck 126 of a suitably-powered drill. During this process, it may be convenient to temporarily secure the two workpieces by supporting an edge of second workpiece 128 along an edge of bench-mounted base 20, as is illustrated in FIG. 5.

The preferred pocket cutter system is equipped with a transport lock operated by knob 126 located on an upper right portion of column 24. Transport lock knob 126 is connected in the preferred embodiment to a threaded rod (not shown) which can be adjusted to protrude inside of column 24 in order to lock the motor unit into its down position as illustrated in FIG. 6 for storage or transportation. Transport lock knob 126 may also be used to lock motor unit 32 in an upward position before making adjustments or changing router bits.

When the transport lock is engaged with the motor unit in the up position, the lock prevents the motor from falling and striking the user while making adjustments or changing bits. When the transport lock is engaged with the motor in the down position (see FIG. 6), the system may be carried by handle 26 like a suitcase; furthermore, the transport lock normally is engaged with the motor in its down position before positioning the system into a carrying case.

In the preferred embodiment, the transport lock is engaged by rotating lock knob 126 clockwise four to six full turns and is disengaged by rotating knob 126 counterclockwise by a similar amount. When the transport lock is released, motor unit 32 preferably tilts at approximately 45° as is shown in FIG. 1, this orientation being maintained in the preferred embodiment by a biasing spring 128 which biases up against the bottom of motor carriage 94 and moves with the motor carriage as it is repositioned for operation or storage of the system.

When changing router bits 34, it is typical to position the motor unit in an upward position so that router bit 34 is pointing straight up. Router bit 34 is loosened in the preferred embodiment by engaging a spindle lock (not shown) and turning collet nut 30 counter-clockwise with a collet wrench (not shown). When positioning a router bit 34 into the router collet, the shank should be cleaned and then positioned into the collet until the shoulder on the shank bottoms on the collet. With the spindle lock engaged, collet nut 30 preferably is rotated clockwise by hand until the spindle lock engages in the motor spindle. Then, while still holding the spindle lock engaged, collet nut 30 is tightened by turning it clockwise using the collet wrench.

The present invention is to be limited only in accordance with the scope of the appended claim, since others skilled in the art may devise other embodiments still within the limits of the claims.

What is claimed is:

1. A bench-mountable, pocket joint cutter system for holding and forming a pocket cut and fastener bore into a first workpiece so that the first workpiece can be coupled to a second workpiece, the system comprising:
   a. first workpiece means for securing the first workpiece in a predetermined position and for pivotally guiding a cutter for forming the pocket cut into the first workpiece and for forming the fastener bore into the first workpiece; and
   b. bench mounting means cooperating with the first workpiece means for securing the system to a bench;
   c. whereby the system can be mounted to a bench, and the first workpiece can be brought to the system and held in position while the user forms the pocket cut and fastener bore.

2. The bench-mountable, pocket joint cutter system of claim 1 wherein the bench mounting means comprises a base member mountable to the bench, the base member having an upper surface for supporting the first workpiece.

3. The bench-mountable, pocket joint cutter system of claim 2 wherein the base member defines apertures for use in mounting the base to the bench.

4. The bench-mountable, pocket joint cutter system of claim 2 wherein the base member comprises an edge portion which can be used to secure the second workpiece while the first workpiece is being joined to it.

5. The bench-mountable pocket joint cutter system of claim 1 wherein the first workpiece means comprises quick-action securing means comprising a quick-action clamp for quickly securing the first workpiece to the base member.

6. The bench-mountable pocket joint cutter system of claim 5 wherein the quick-action clamp comprises a "V" notch defined by the clamp, the "V" notch being located and adapted for alignment with a mark on the first workpiece at a desired side-to-side position of the pocket cut.

7. The bench-mountable, pocket joint cutter system of claim 5 wherein:
   a. the quick-action securing means comprises variable-first workpiece-thickness adjustment means for adjusting the capacity of the quick-action clamp to a nominal thickness of the first workpiece; and
   b. the first workpiece means further comprises:
      i. router guide means for guiding a router bit to cut the pocket into an upper surface of the first workpiece; and
      ii. router-bit depth-of-cut adjustment means for adjusting the depth to which the router bit cuts the pocket into the upper surface of the first workpiece.

8. The bench-mountable, pocket joint cutter system of claim 7 wherein the first workpiece means further comprises:
   a. a base member having an upper surface for supporting the first workpiece; and
   b. stepped-block router-bit depth-of-cut setting means comprising a stepped guide block having a lower surface for placement on an upper surface of the base member, the guide block defining a plurality of router bit guide surfaces located at a plurality of predetermined distances above the guide block lower surface.

9. The bench-mountable, pocket joint cutter system of claim 8 wherein the guide block comprises a label corresponding to each router bit guide surface, each label designating a nominal first workpiece thickness corresponding to the depth of cut established by the particular guide surface so that, by adjusting the router-bit depth-of-cut adjustment means until the lower end of the router bit contacts a particular guide surface, an appropriate depth of cut is established for the nominal first workpiece thickness indicated by the corresponding label.

10. The bench-mountable, pocket joint cutter system of claim 1 wherein the first workpiece means comprises drill guide means for guiding a drill bit in order to drill the fastener bore into the pocket cut location at an orientation which is perpendicular to a first workpiece surface which is to be joined to a second workpiece surface.

11. The bench-mountable, pocket joint cutter system of claim 1 wherein the first workpiece means comprises:
   a. quick-action securing means comprising a quick-action clamp for quickly securing the first workpiece to the base member, the quick-action securing means comprising variable-first workpiece-thickness adjustment means for adjusting the capacity of the quick-action clamp to the nominal thickness of the first workpiece; and
   b. drill guide means for guiding a drill bit in order to drill the fastener bore into the pocket cut location at an orientation which is perpendicular to a first workpiece surface which is to be joined to a second workpiece surface, the drill guide means comprising means for maintaining, independent of first workpiece thickness, a uniform distance of the fastener bore from the upper surface of the first workpiece.

12. The bench-mountable, pocket joint cutter system of claim 1 wherein the first workpiece means comprises:
   a. drill guide means for guiding a drill bit in order to drill the fastener bore into the pocket cut location at an orientation which is perpendicular to a first workpiece surface which is to be joined to a second workpiece surface; and
   b. adjustment means for adjusting the drill guide means so that the distance of the fastener bore from the upper surface of the first workpiece can be varied.

13. The bench-mountable, pocket joint cutter system of claim 1 wherein the first workpiece means comprises first workpiece guide means for guiding the position and orientation of the first workpiece for location of the pocket cut and fastener bore.

14. The bench-mountable, pocket joint cutter system of claim 13 wherein the first workpiece guide means comprises a "V" notch defined by the first workpiece means, the "V" notch being located and adapted for alignment with a mark on the first workpiece at a desired side-to-side position of the pocket cut.

15. The bench-mountable, pocket joint cutter system of claim 2 wherein the base member comprises first workpiece guide means for guiding the position and orientation of the first workpiece for location of the pocket cut and fastener bore.

16. The bench-mountable, pocket joint cutter system of claim 15 wherein the first workpiece guide means comprises a plurality of parallel lines defined on an upper surface of the base member in an orientation along the length of the first workpiece.

17. The bench-mountable, pocket joint cutter system of claim 16 wherein the plurality of parallel lines defined on the upper surface of the base member are marked with index reference numbers corresponding to first workpiece width.

18. The bench-mountable, pocket joint cutter system of claim 15 wherein the first workpiece guide means comprises a fence for guiding the location of the first workpiece, the first workpiece guide means further comprising means for adjustably locating the position of the fence.

19. The bench-mountable, pocket joint cutter system of claim 15 wherein the first workpiece guide means comprises:
   a. first and second nominally parallel fences; and
   b. means for adjustably locating the first and second fences based on the width of the first workpiece.

20. The bench-mountable, pocket joint cutter system of claim 16 wherein the plurality of parallel lines are defined at least in part by ribs formed into the upper surface of the base member.

21. A pocket joint cutter system for forming a pocket cut and fastener bore into a first workpiece so that the first workpiece can be joined to a second workpiece, the system comprising:
   a. pocket cutter means for forming the pocket into a surface of the first workpiece; and
   b. drill guide means for guiding a drill bit in order to form an elongated fastener bore into the pocket at an orientation which is perpendicular to a first workpiece surface which is to be joined to a second workpiece surface.

22. The pocket joint cutter system of claim 21 wherein the system further comprises a base member for supporting the first workpiece, the base member comprising bench-mounting means for securing the base member to a bench.

23. The pocket joint cutter system of claim 22 wherein the base member defines apertures for use in mounting the base member to the bench.

24. The pocket joint cutter system of claim 22 wherein the base member comprises an edge portion which can be used to secure the second workpiece while the first workpiece is being joined to it.

25. The pocket joint cutter system of claim 21 wherein the drill guide means comprises adjustment means for adjusting the location of the drill guide means so that the distance of the fastener bore from the first surface of the first workpiece can be varied.

26. The pocket joint cutter system of claim 21 wherein the pocket cutter means comprises quick-action securing means comprising a quick-action clamp for quickly securing the first workpiece to the system.

27. The pocket joint cutter system of claim 26 wherein the quick-action clamp comprises a "V" notch defined by the clamp, the "V" notch being located and adapted for alignment with a mark on the first workpiece at a desired side-to-side position of the pocket cut.

28. The pocket joint cutter system of claim 26 wherein:
   a. the quick-action securing means comprises variable-first workpiece-thickness adjustment means for adjusting the capacity of the quick-action clamp to a nominal thickness of the first workpiece; and
   b. the first workpiece means comprises:
      i. router guide means for guiding a router bit to cut the pocket into an upper surface of the first workpiece; and
      ii. router-bit depth-of-cut adjustment means for adjusting the depth to which the router bit cuts the pocket into the upper surface of the first workpiece.

29. The pocket joint cutter system of claim 28 wherein the system further comprises:
   a. a base member for supporting the first workpiece; and
   b. stepped-block router-bit depth-of-cut setting means comprising a stepped guide block having a lower surface for placement on an upper surface of the base member, the guide block defining a plurality of router bit guide surfaces located at a plurality of predetermined distances above the guide block lower surface.

30. The pocket joint cutter system of claim 29 wherein the guide block comprises a label corresponding to each router bit guide surface, each label designating a nominal first workpiece thickness corresponding to the depth of cut established by the particular guide surface so that, by adjusting the router-bit depth-of-cut adjustment means until the lower end of the router bit contacts a particular guide surface, an appropriate depth of cut is established for the nominal first workpiece thickness indicated by the corresponding label.

31. The pocket joint cutter system of claim 29 wherein the system further comprises:
 a. a base member for supporting the first workpiece;
 b. quick-action securing means comprising a quick-action clamp for quickly securing the first workpiece to the base member, the quick-action securing means comprises variable-first workpiece-thickness adjustment means for adjusting the capacity of the quick-action clamp to a nominal thickness of the first workpiece; and
 c. drill guide means for guiding a drill bit in order to drill the fastener bore into the pocket cut location at an orientation which is perpendicular to a joint surface of the first workpiece, the drill guide means comprising means for maintaining, independent of first workpiece thickness, a uniform fastener bore distance from the upper surface of the first workpiece.

32. The pocket joint cutter system of claim 21 wherein the system comprises adjustment means for adjusting the drill guide means so that the distance of the fastener bore from the upper surface of the first workpiece can be varied.

33. The pocket joint cutter system of claim 21 further comprising first workpiece guide means for guiding the position of the first workpiece for location of the pocket cut and fastener bore.

34. The pocket joint cutter system of claim 33 wherein the first workpiece guide means comprises a "V" notch defined by the first workpiece guide means, the "V" notch being located and adapted for alignment with a mark on the first workpiece at a desired side-to-side position of the pocket cut.

35. The pocket joint cutter system of claim 21 wherein:
 a. the system comprises a base member for supporting the first workpiece; and
 b. the base member comprises first workpiece guide means for guiding the position of the first workpiece for location of the pocket cut and fastener bore.

36. The pocket joint cutter system of claim 35 wherein the first workpiece guide means comprises a plurality of parallel lines defined on an upper surface of the base member in an orientation along the length of the first workpiece.

37. The pocket joint cutter system of claim 36 wherein the plurality of parallel lines defined on the upper surface of the base member are marked with index reference numbers corresponding to first workpiece width.

38. The pocket joint cutter system of claim 35 wherein the first workpiece guide means comprises a fence for guiding the location of the first workpiece, the first workpiece guide means further comprising means for adjustably locating the position of the fence.

39. The pocket joint cutter system of claim 35 wherein the first workpiece guide means comprises:
 a. first and second nominally parallel fences; and
 b. means for adjustably locating the first and second fences based on the width of the first workpiece.

40. The pocket joint cutter system of claim 36 wherein the plurality of parallel lines are defined at least in part by ribs formed into an upper surface of the base member.

41. A pocket joint cutter system for forming a pocket cut and fastener bore into a first workpiece so that the first workpiece can be coupled to a second workpiece, the system comprising:
 a. a base member for supporting the first workpiece;
 b. a clamping system supported by the base for holding the first workpiece in position;
 c. a column supported by the base;
 d. a router pivotably supported above the base by the column, the router comprising a collet rotated by a router motor, the collet comprising means for securing a router bit to be spun at high rpm by the motor, the router being pivotable from an upward position in which the router bit is above the first workpiece to lower positions which swing the router bit in an arc to make the pocket cut into an upper surface of the first workpiece; and
 e. drill guide means for guiding a drill bit in order to drill the fastener bore into the pocket cut location.

42. The pocket joint cutter system of claim 41 wherein the base member comprises bench-mounting means for securing the base to a bench.

43. The pocket joint cutter system of claim 42 wherein the base member defines apertures for use in mounting the base member to the bench.

44. The pocket joint cutter system of claim 42 wherein the base member comprises an edge portion which can be used to secure the second workpiece while the first workpiece is being joined to it.

45. The pocket joint cutter system of claim 41 wherein the system further includes a clamping system comprising quick-action securing means comprising a quick-action clamp for quickly securing the first workpiece to the base member.

46. The pocket joint cutter system of claim 45 wherein the quick-action clamp comprises a "V" notch defined by the clamp, "V" notch being located and adapted for alignment with a mark on the first workpiece at a desired side-to-side position of the pocket cut.

47. The pocket joint cutter system of claim 45 wherein:
 a. the quick-action securing means comprises variable-first workpiece-thickness adjustment means for adjusting the capacity of the quick-action clamp to a nominal thickness of the first workpiece; and
 b. the column comprises router depth-of-cut adjustment means for adjusting the depth to which the router bit cuts the pocket into the upper surface of the first workpiece.

48. The pocket joint cutter system of claim 45 wherein the router depth-of-cut adjustment means comprises stepped-block router-bit depth-of-cut setting means comprising a stepped guide block having a lower surface for placement on an upper surface of the base member, the guide block defining a plurality of router bit guide surfaces located at a plurality of predetermined distances above the guide block lower surface.

49. The pocket joint cutter system of claim 48 wherein the guide block comprises a label corresponding to each router bit guide surface, each label designating a nominal first workpiece thickness corresponding to the depth of cut established by the particular guide surface so that, by adjusting the router-bit depth-of-cut adjustment means until the lower end of the router bit contacts a particular guide surface, an appropriate depth of cut is established for the nominal first workpiece thickness indicated by the corresponding label.

50. The pocket joint cutter system of claim 41 wherein the system further comprises:
   a. quick-action securing means comprising a quick-action clamp for quickly securing the first workpiece to the base member, the quick-action securing means comprising variable-first workpiece-thickness adjustment means for adjusting the capacity of the quick-action clamp to a nominal thickness of the first workpiece; and
   b. drill guide means for guiding a drill bit in order to drill the fastener bore into the pocket cut location at an orientation which is perpendicular to a joint surface of the first workpiece, the drill guide means comprising means for maintaining, independent of first workpiece thickness, a uniform fastener bore distance from the upper surface of the first workpiece.

51. The pocket joint cutter system of claim 41 wherein the system further comprises adjustment means for adjusting the drill guide means so that the distance of the fastener bore from the upper surface of the first workpiece can be varied.

52. The pocket joint cutter system of claim 41 wherein the system further comprises first workpiece guide means for guiding the position of the first workpiece for location of the pocket cut and fastener bore.

53. The pocket joint cutter system of claim 52 wherein the first workpiece guide means defines a "V" notch located and adapted for alignment with a mark on the first workpiece at a desired side-to-side position of the pocket cut.

54. The pocket joint cutter system of claim 52 wherein the first workpiece guide means comprises a plurality of parallel lines defined on an upper surface of the base member in an orientation along the length of the first workpiece.

55. The pocket joint cutter system of claim 52 wherein the first workpiece guide means comprises a plurality of parallel lines defined on an upper surface of the base member in an orientation along the length of the first workpiece.

56. The pocket joint cutter system of claim 55 wherein the plurality of parallel lines defined on the upper surface of the base member are marked with index reference numbers corresponding to first workpiece width.

57. The pocket joint cutter system of claim 52 wherein the first workpiece guide means comprises a fence for guiding the location of the first workpiece, the first workpiece guide means further comprising means for adjustably locating the position of the fence.

58. The pocket joint cutter system of claim 52 wherein the first workpiece guide means comprises:
   a. first and second nominally parallel fences; and
   b. means for adjustably locating the first and second fences based on the width of the first workpiece.

59. The pocket joint cutter system of claim 55 wherein the plurality of parallel lines are defined at least in part by ribs formed into an upper surface of the base member.

60. The pocket joint cutter system of claim 41 wherein the drill guide means comprises means for guiding the drill bit into the first workpiece at a direction which is perpendicular to a first workpiece surface which is to be joined to a second workpiece surface.

61. The pocket joint cutter system of claim 41 wherein the column comprises an adjustable stop for selectably limiting the distance over which the router pivots in order to selectively adjust the length of the pocket cut.

* * * * *